US00RE50575E

(19) United States
(12) Reissued Patent
Lee et al.

(10) Patent Number: US RE50,575 E
(45) Date of Reissued Patent: *Sep. 2, 2025

(54) DISPLAY APPARATUS, ELECTRONIC DEVICE, INTERACTIVE SYSTEM, AND CONTROLLING METHODS THEREOF

(71) Applicant: SAMSUNG ELECTRONICS CO., LTD., Suwon-si (KR)

(72) Inventors: Yui-yoon Lee, Suwon-si (KR); Sung-kil Cho, Suwon-si (KR); Ki-suk Kim, Suwon-si (KR)

(73) Assignee: SAMSUNG ELECTRONICS CO., LTD., Suwon-si (KR)

( * ) Notice: This patent is subject to a terminal disclaimer.

(21) Appl. No.: 18/132,762

(22) Filed: Apr. 10, 2023

Related U.S. Patent Documents

Reissue of:
(64) Patent No.: 8,983,299
Issued: Mar. 17, 2015
Appl. No.: 13/919,358
Filed: Jun. 17, 2013

U.S. Applications:
(63) Continuation of application No. 17/143,364, filed on Jan. 7, 2021, now Pat. No. Re. 49,493, which is a
(Continued)

(30) Foreign Application Priority Data

Jun. 29, 2012 (KR) ..... 10-2012-0071361

(51) Int. Cl.
*H04B 10/00* (2013.01)
*G08C 19/28* (2006.01)
*H04N 21/422* (2011.01)

(52) U.S. Cl.
CPC ..... *H04N 21/42222* (2013.01); *G08C 19/28* (2013.01); *H04N 21/42203* (2013.01); *H04N 21/42221* (2013.01)

(58) Field of Classification Search
CPC ..... H04N 21/42222; H04N 21/42221; H04N 21/42203; G08C 19/28
See application file for complete search history.

(56) References Cited

U.S. PATENT DOCUMENTS 5,481,252 A 1/1996 Kwon et al.
6,757,030 B2 6/2004 Umeda
(Continued)

FOREIGN PATENT DOCUMENTS

CN 1949756 A 4/2007
CN 101719998 A 6/2010
(Continued)

OTHER PUBLICATIONS

European Extended Search Report issued Jan. 15, 2024 by the European Patent Office for EP Patent Application No. 21150090.5.
(Continued)

*Primary Examiner* — Christina Y. Leung
(74) *Attorney, Agent, or Firm* — Sughrue Mion, PLLC

(57) ABSTRACT

A display apparatus, an electronic device, an interactive system, and controlling methods thereof are provided. The display apparatus includes: a storage unit which stores peripheral device control information in which a remote control signal for controlling a peripheral device of the display apparatus matches with a control signal corresponding to a user voice; a voice collector which the user voice; a communicator which transmits the collected user voice to the display apparatus and receives the control signal corresponding to the user voice from the display apparatus; an infrared ray (IR) transmitter which transmits the remote control signal for controlling the peripheral device; and a controller which, if the control signal is received from the display apparatus, controls the IR transmitter to transmit a remote control signal corresponding to the received control
(Continued)

signal among remote control signals stored in the storage unit, to the peripheral device.

16 Claims, 8 Drawing Sheets

Related U.S. Application Data continuation of application No. 16/179,398, filed on Nov. 2, 2018, now Pat. No. Re. 48,423, which is a continuation of application No. 14/965,196, filed on Dec. 10, 2015, now Pat. No. Re. 47,168, which is an application for the reissue of Pat. No. 8,983,299.

(56) References Cited

U.S. PATENT DOCUMENTS

| | | | | |
|---|---|---|---|---|
| 8,032,383 | B1 * | 10/2011 | Bhardwaj et al. | 704/275 |
| RE47,168 | E * | 12/2018 | Lee | H04N 21/42203 |
| RE48,423 | E * | 2/2021 | Lee | H04N 21/42203 |
| RE49,493 | E * | 4/2023 | Lee | H04N 21/42222 398/106 |
| 2002/0036720 | A1 | 3/2002 | Umeda | |
| 2002/0052746 | A1 | 5/2002 | Handelman | |
| 2002/0129289 | A1 | 9/2002 | Sato | |
| 2004/0203387 | A1 | 10/2004 | Grannan | |
| 2008/0103780 | A1 | 5/2008 | Dacosta | |
| 2008/0208589 | A1 | 8/2008 | Cross et al. | |
| 2009/0030681 | A1 * | 1/2009 | Sureka et al. | 704/235 |
| 2010/0107105 | A1 | 4/2010 | Kubo | |
| 2010/0333163 | A1 * | 12/2010 | Daly | 725/133 |
| 2011/0067059 | A1 | 3/2011 | Johnston et al. | |
| 2012/0022867 | A1 | 1/2012 | Ballinger et al. | |
| 2013/0229584 | A1 * | 9/2013 | Rhodes et al. | 348/734 |

FOREIGN PATENT DOCUMENTS

| | | | |
|---|---|---|---|
| CN | 101729084 | A | 6/2010 |
| CN | 101938391 | A | 1/2011 |
| CN | 102196207 | A | 9/2011 |
| CN | 202190331 | U | 4/2012 |
| EP | 2 680 597 | B1 | 6/2017 |
| JP | 4-266296 | A | 9/1992 |
| JP | 2001-145180 | A | 5/2001 |
| JP | 2002-101476 | A | 4/2002 |
| JP | 2002-112064 | A | 4/2002 |
| JP | 2005-65156 | A | 3/2005 |
| JP | 2005-72764 | A | 3/2005 |
| KR | 10-2005-0066464 | A | 6/2005 |
| WO | 2011000749 | A1 | 1/2011 |

OTHER PUBLICATIONS

Communication dated Apr. 14, 2022 issued by the European Patent Office in EP Application No. 21150090.5.

Communication issued May 7, 2021 by the European Patent Office in counterpart European Patent Application No. 21150090.5.

Communication dated Dec. 4, 2018, from the State Intellectual Property Office of People's Republic of China in counterpart Application No. 201710483525.9.

Communication dated Jul. 31, 2018, issued by the European Patent Office in counterpart European Application No. 18179523.8.

Communication dated Apr. 28, 2018, 2018, issued by the State Intellectual Property Office of P.R. China in counterpart Chinese Application No. 201710483525.9.

Communication dated May 8, 2018, issued by the Japanese Intellectual Property Office in counterpart Japanese Application No. 2013-133954.

Communication dated Jun. 28, 2017 issued by the State Intellectual Property Office of People's Republic of China in counterpart Chinese Patent Application No. 201310254630.7.

Communication dated Jul. 4, 2017 issued by the Japanese Patent Office in counterpart Japanese Patent Application No. 2013-133954.

Communication dated Aug. 1, 2017 issued by the European Patent Office in counterpart European Patent Application No. 17165886.7.

Communication dated Jul. 7, 2016, issued by the European Patent Office in counterpart European Application No. 13173433.7.

Communication dated Apr. 23, 2025 issued by the European Patent Office in European Patent Application No. 21150090.5.

Communication dated Aug. 4, 2014, issued by the European Patent Office in counterpart European Application No. 13173433.7.

* cited by examiner

FIG. 1 (Amended)
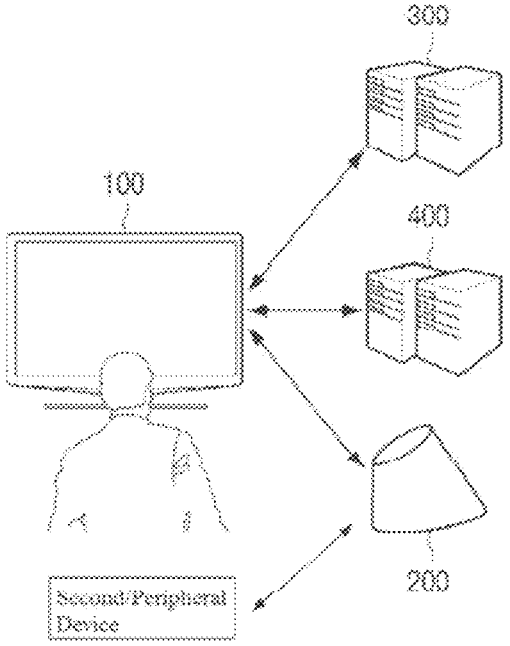

DISPLAY APPARATUS, ELECTRONIC DEVICE, INTERACTIVE SYSTEM, AND CONTROLLING METHODS THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 8,983,299. The reissue applications are the present application, U.S. patent application Ser. No. 17/143,364, U.S. patent application Ser. No. 16/179,398 (issued as U.S. Reissue Pat. No. RE48,423 on Feb. 2, 2021), and U.S. patent application Ser. No. 14/965,196 (issued as U.S. Reissue Pat. No. RE47,168 on Dec. 18, 2018). U.S. patent application Ser. No. 14/965,196, filed on Dec. 10, 2015 and issued as U.S. Reissue Pat. No. RE47,168 on Dec. 18, 2018, is a reissue application of U.S. Pat. No. 8,983,299, which was filed as U.S. patent application Ser. No. 13/919,358 on Jun. 17, 2013 and issued on Mar. 17, 2015, and which claims priority from Korean Patent Application No. 10-2012-0071361, filed on Jun. 29, 2012, in the Korean Intellectual Property Office, the disclosures of which are incorporated herein by reference in their entireties. U.S. patent application Ser. No. 16/179,398, filed on Nov. 2, 2018, is a continuation reissue of U.S. patent application Ser. No. 14/965,196 (issued as U.S. Reissue Pat. No. RE47,168). U.S. patent application Ser. No. 17/143,364, filed on Jan. 7, 2021, is a continuation reissue of U.S. patent application Ser. No. 16/179,398 (issued as U.S. Reissue Pat. No. RE48,423). The present application is a continuation reissue of U.S. patent application Ser. No. 17/143,364.*

CROSS-REFERENCE TO RELATED APPLICATION

This application claims priority from Korean Patent Application No. 10-2012-0071361, filed on Jun. 29, 2012, in the Korean Intellectual Property Office, the disclosure of which is incorporated herein by reference in its entirety.

BACKGROUND

1. Field

Apparatuses, systems and methods consistent with exemplary embodiments generally relate to a display apparatus, an electronic device, an interactive system, and controlling methods thereof, and more particularly, to a display apparatus which is controlled according to a voice of a user, an electronic device, an interactive system, and controlling methods thereof.

2. Description of the Related Art

Various types of display apparatuses have developed and have been distributed with the development of electronic technologies. In particular, various types of display apparatuses including a TV have been used in homes. These display apparatuses have gradually had various functions according to demands of users. In particular, a TV has been connected to the Internet to support an Internet service. Also, a user may view a large number of digital broadcast channels through the TV.

Therefore, various input methods for efficiently using various functions of a display apparatus are required. For example, an input method using a remote controller, an input method using a mouse, an input method using a touch pad, etc. have been applied to display apparatuses.

However, it is difficult to effectively use various functions of a display apparatus by using only such simple input methods. For example, if all functions of a display apparatus are realized to be controlled by only a remote controller, it is necessary to increase the number of buttons of the remote controller. In this case, it is not easy for a user to learn how to use the remote controller. Also, in a method of displaying various menus on a screen to allow a user to search for and select a corresponding menu, the user is to check a complicated menu tree one by one in order to select a desired menu.

Various types of peripheral devices, such as a set-top box, a digital versatile disc (DVD) player, a home theater, etc., are connected to a display apparatus to be used. A remote controller operating along with the peripheral devices is to be separately controlled in order to control the peripheral devices. Therefore, a universal remote controller or the like capable of separately or simultaneously controlling various types of peripheral devices has been developed. However, in order to use the universal remote controller, a user has to directly search for manufacturing companies and model names of the peripheral devices and register the manufacturing companies and the model names in the universal remote controller.

Accordingly, an efficient input method for controlling a display apparatus and various types of peripheral devices is required.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a display apparatus which operates along with an external server to perform an operation corresponding to a voice of a user, an electronic device which controls peripheral devices through the voice of the user, an interactive system, and controlling methods thereof.

According to an aspect of the exemplary embodiments, there is provided an electronic device which communicates with a display apparatus. The electronic device may include: a storage which stores peripheral device control information, said peripheral device control information being related to a remote control signal for controlling a peripheral device of the display apparatus that matches with a control signal corresponding to the user voice; a voice collector which the user voice; a communicator which transmits the collected user voice to the display apparatus and receives the control signal corresponding to the user voice from the display apparatus; an infrared ray (IR) transmitter which transmits the remote control signal for controlling the peripheral device; and a controller which, if the control signal is received from the display apparatus, controls the IR transmitter to transmit the remote control signal corresponding to the received control signal among remote control signals stored in the storage unit, to the peripheral device.

The electronic device may further include an IR receiver which receives the remote control signal from a remote controller which controls the peripheral device of the display apparatus. The controller may transmit the collected user voice to the display apparatus in response to the received remote control signal and receive the control signal corresponding to the user voice from the display apparatus to generate the peripheral device control information.

The peripheral device control information may further include information about a received external input mode. The communicator may receive the control signal and the information about the external input mode of the display apparatus. If the control signal and the information about the external input mode are received from the display apparatus, the controller may control the IR transmitter to transmit the remote control signal corresponding to the received control signal and the external input mode to the peripheral device.

The electronic device may further include an IR receiver which receives the remote control signal from a remote controller which controls the peripheral device of the display apparatus. The controller may transmit the collected user voice to the display apparatus in response to the remote control signal and receive the control signal corresponding to the user voice and the information about the external input mode of the display apparatus from the display apparatus to generate the peripheral device control information.

The electronic device may be one from among an IR blaster and a [multiband] *multi brand* remote controller (MBR).

According to another aspect of the exemplary embodiments, there is provided a display apparatus which communicates with a first device which controls a second device. The display apparatus may include: a first communicator which communicates with the first device; a second communicator which communicates with a server which performs a voice recognition function; and a controller which, if a user voice is received from the first device, transmits the received user voice to the server, receives a control signal corresponding to the user voice from the server, and transmits the control signal to the first device. The control signal may be a signal which corresponds to a remote control signal for controlling the second device in the electronic device.

If the user voice is received, the controller may control to determine an external input mode, transmit information about the determined external input mode and the user voice to the server, receive the information about the external input mode and a control signal corresponding to the user voice from the server, and transmit the information about the external input mode and the control signal to the first device.

If the user voice is received, the controller may control to determine an external input mode and transmit information about the determined external input mode and the control signal received from the server, to another server.

According to another aspect of the exemplary embodiments, there is provided a method of controlling a first device. The method may include: storing second device control information in which a remote control signal for controlling a second device of a display apparatus matches with a control signal corresponding to the user voice; collecting the user voice; transmitting the collected user voice to the display apparatus; receiving the control signal corresponding to the user voice from the display apparatus; and transmitting one of pre-stored remote control signals corresponding to the received control signal to the second device.

The storing of the second device control information may include: receiving the remote control signal from a remote controller which controls the second device of the display apparatus; collecting the user voice in response to the remote control signal; transmitting the collected user voice to the display apparatus; receiving the control signal corresponding to the user voice from the display apparatus; and generating and storing the second device control information in which the received remote control signal and the control signal match with each other.

The second device control information may further include information about an external input mode. The reception of the control signal may include receiving the control signal and the information about an external input mode of the display apparatus. The transmission of the one of the remote control signals to the second device may include transmitting the received control signal and the remote control signal corresponding to the information about the external input mode, to the second device.

The storing of the second device control information may include: receiving the remote control signal from the remote controller which controls the second device of the display apparatus; collecting the user voice in response to the remote control signal; transmitting the collected user voice to the display apparatus; receiving the control signal corresponding to the user voice and the information about the external input mode of the display apparatus from the display apparatus; and generating and storing the second device control information in which the received remote control signal, the control signal, and the information about the external input mode match with one another.

The electronic device may be one from among an IR blaster and an MBR.

According to another aspect of the exemplary embodiments, there is provided a method of controlling a display apparatus which communicates with a first device which controls a second device. The method may include: receiving a user voice from the first device; transmitting the received user voice to a server which performs a voice recognition function; receiving a control signal corresponding to the user voice from the server; and transmitting the received control signal to the first device. The control signal may be a signal which corresponds to a remote control signal which controls the second device.

The method may further include: if the user voice is received, determining an external input mode; and transmitting information about the external input mode. The receiving of the control signal may comprise receiving the information related to the external input mode and the control signal corresponding to the user voice from the server.

The method may further include: if the user voice is received, determining an external input mode; and transmitting information about the determined external input mode to the first device.

According to another aspect of the exemplary embodiments, there is provided an interactive system comprising a display apparatus and a first device which is to control a second device of the display apparatus. The first device may transmit a collected user voice to the display apparatus, receive a control signal corresponding to the user voice, and transmit one of pre-stored remote control signals corresponding to the received control signal to the second device. The display apparatus may transmit the user voice to a server which performs a voice recognition function if the display apparatus receives the user voice from the first device, receive the control signal corresponding to the user voice from the server, and transmit the control signal to the first device.

The first device may be an electronic device and the second device may be a peripheral device of the display apparatus.

As described above, according to various exemplary embodiments of the present general inventive concept, a user voice may be used as a means to control a display apparatus and a peripheral device of the display apparatus. Therefore, convenience of a user may be improved.

Also, the user may use an electronic device to directly search for a manufacturing company and a model name of the peripheral device and register a remote control signal corresponding to the user voice without registering the manufacturing company and the model name in a remote controller in order to control the peripheral device. Therefore, the convenience of the user may be improved.

BRIEF DESCRIPTION OF THE DRAWINGS

The above and/or other aspects will be more apparent by describing certain exemplary embodiments with reference to the accompanying drawings, in which:

FIG. 1 is a view illustrating an interactive system according to an exemplary embodiment;

DETAILED DESCRIPTION OF EXEMPLARY EMBODIMENTS

Figure 2:
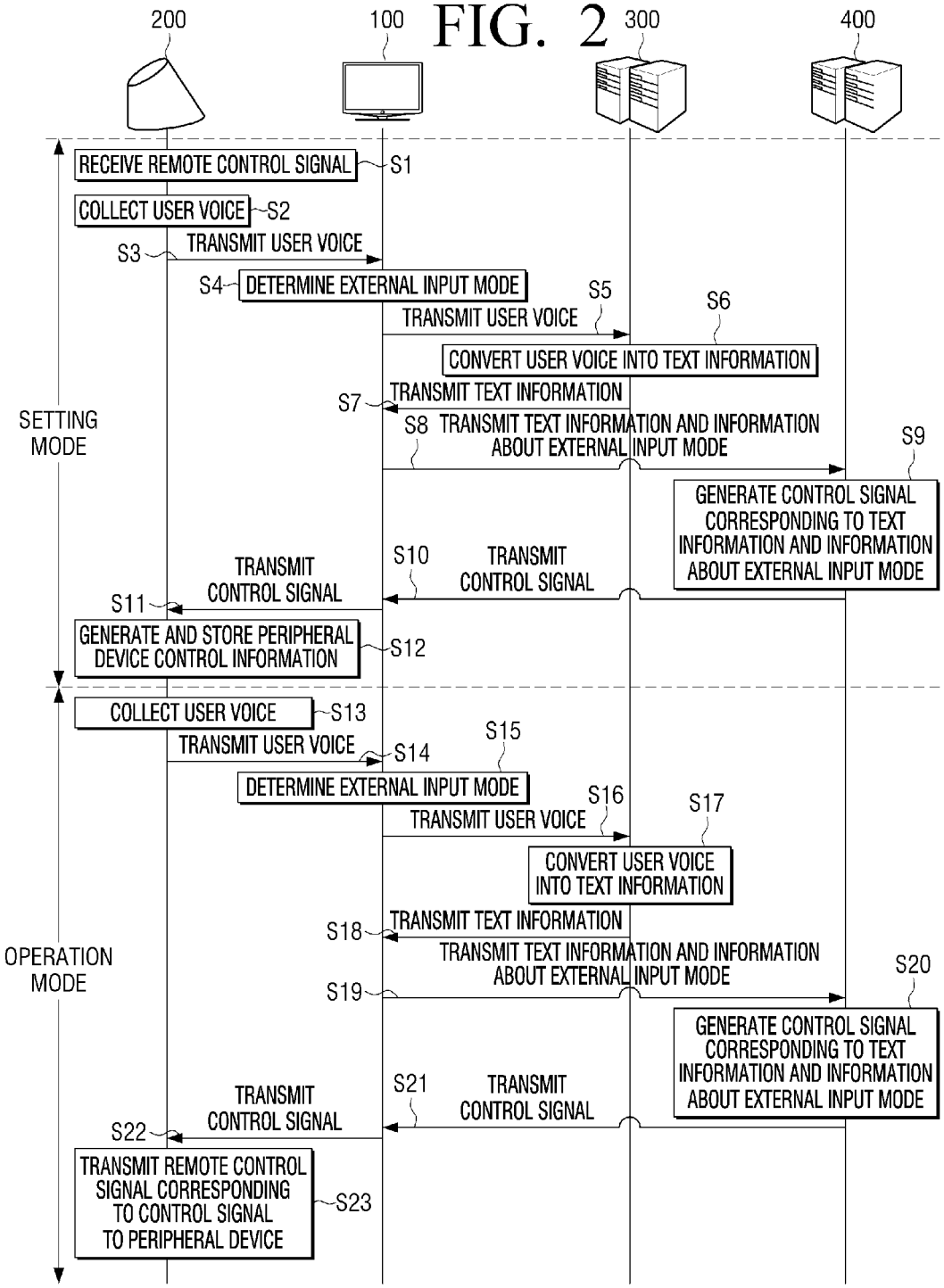
FIGS. 2 and 3 are timing diagrams illustrating respective operations of the interactive system of FIG. 1.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a view illustrating an interactive system according to an exemplary embodiment. Referring to FIG. 1, the interactive system includes a display apparatus 100, an electronic device 200, a first server 300, and a second server 400. As shown in FIG. 1, the display apparatus 100 may be a smart TV and is only exemplary. Therefore, the display apparatus 100 may be realized as various types of apparatuses such as a cellular phone such as a smart phone, a desktop PC, a notebook PC, a navigation system, etc. The electronic device 200 may be realized as a device such as an infrared ray (IR) blaster, a multi [band] *brand* remote controller (MBR), or the like.

The interactive system may operate in a voice recognition mode according to the present exemplary embodiment. The voice recognition mode may include a setting mode and an operation mode. The interactive system may differently operate according to the setting and operation modes and thus will be described according to the setting and operation modes. The setting and operation modes may be changed by a user through the display apparatus 100 when the interactive system operates.

<Setting Mode>

The setting mode refers to a mode for setting peripheral device control information for controlling a peripheral device of the display apparatus 100. An operation of the setting mode will be described according to each exemplary embodiment. The interactive system operates differently according to whether information about an external input mode of the display apparatus 100 is transmitted to the second server 400 or to the electronic device 200.

First Exemplary Embodiment

According to the first exemplary embodiment, in the setting mode, the electronic device 200 receives a control signal from a remote controller (not shown) which controls the peripheral device. The electronic device 200 collects a user voice corresponding to a remote control signal and transmits the user voice to the display apparatus 100. If the display apparatus 100 receives the user voice, the display apparatus 100 determines a current external input mode thereof and transmits the received user voice to the first server 300. If the first server 300 receives the user voice from the display apparatus 200, the first server 300 converts the user voice into text information and transmits the text information to the display apparatus 100.

The display apparatus 100 transmits the text information received from the first server 300 and information about the determined external input mode to the second server 400. If the second server 400 receives the text information from the display apparatus 100, the second server 400 generates a control signal corresponding to the received text information and the information about the external input mode and transmits the control signal to the display apparatus 100.

The display apparatus 100 transmits the control signal to the electronic device 200. Also, the electronic device 200 matches the control signal received from the display apparatus 100 with the remote control signal received from the remote controller to generate and store peripheral device control information.

Second Exemplary Embodiment

According to the second exemplary embodiment, in the setting mode, the electronic device 200 receives a control signal from the remote controller which is to control the peripheral device. The electronic device 200 also collects the user voice corresponding to the remote control signal and transmits the user voice to the display apparatus 100. If the display apparatus 100 receives the user voice, the display apparatus 100 determines the current external input mode thereof and transmits the user voice to the first server 300. If the first server 300 receives the user voice from the display apparatus 100, the first server 300 converts the user voice into the text information and transmits the text information to the display apparatus 100.

The display apparatus 100 also transmits the text information received from the first server 300 to the second server 400. If the second server 400 receives the text information from the display apparatus 100, the second server 400 generates the control signal corresponding to the text information and transmits the control signal to the display apparatus 100.

The display apparatus 100 transmits the control signal and the information about the determined external input mode to the electronic device 200. Also, the electronic device 200 matches the remote control signal received from the remote controller, the control signal received from the display apparatus 100, and the information about the external input mode with one another to generate and store the peripheral device control information.

<Operation Mode>

The operation mode refers to a mode for transmitting the remote control signal corresponding to the user voice to the peripheral device in order to control the peripheral device of the display apparatus 100. An operation of the operation mode will be described according to exemplary embodiments.

First Exemplary Embodiment

According to the first exemplary embodiment, in the operation mode, the electronic device 200 collects the user voice for controlling the peripheral device and transmits the user voice to the display apparatus 100. If the display apparatus 100 receives the user voice, the display apparatus 100 determines the current external input mode thereof and transmits the user voice to the first server 300. If the first server 300 receives the user voice from the display apparatus 100, the first server 300 converts the user voice into the text information and transmits the text information to the display apparatus 100.

The display apparatus 100 transmits the text information received from the first server 300 and the information about the determined external input mode to the second server 400. If the second server 400 receives the text information from the display apparatus 100, the second server 400 generates the control signal corresponding to the text information and the information about the external input mode and transmits the control signal to the display apparatus 100.

The display apparatus 100 transmits the control signal to the electronic device 200. Also, the electronic device 200 compares the pre-stored control signal received from the display apparatus 100 with a control signal of the peripheral device control information to transmit a corresponding remote control signal to the peripheral device.

Second Exemplary Embodiment

According to the second exemplary embodiment, in the operation mode, the electronic device 200 collects the user voice for controlling the peripheral device and transmits the user voice to the display apparatus 100. If the display apparatus 100 receives the user voice, the display apparatus 100 determines the current external input mode and transmits the user voice to the first server 300. If the first server 300 receives the user voice from the display apparatus 100, the first server 300 converts the user voice into the text information and transmits the text information to the display apparatus 100.

The display apparatus 100 also transmits the text information received from the first server 300 to the second server 400. If the second server 400 receives the text information from the display apparatus 100, the second server 400 generates the control signal corresponding to the text information and transmits the control signal to the display apparatus 100.

The display apparatus 100 transmits the control signal and the information about the determined external input mode to the electronic device 200. Also, the electronic device 200 compares the control signal received from the display apparatus 100 and the information about the external input mode with a control signal of the peripheral device control information and information about the external input mode, which are pre-stored, to transmit a corresponding remote control signal to the peripheral devices.

In the above-described exemplary embodiment, the first and second servers 300 and 400 are separate servers which respectively perform different functions. However, the first and second servers 300 and 400 may be realized as one server according to an exemplary embodiment.

Figure 3:
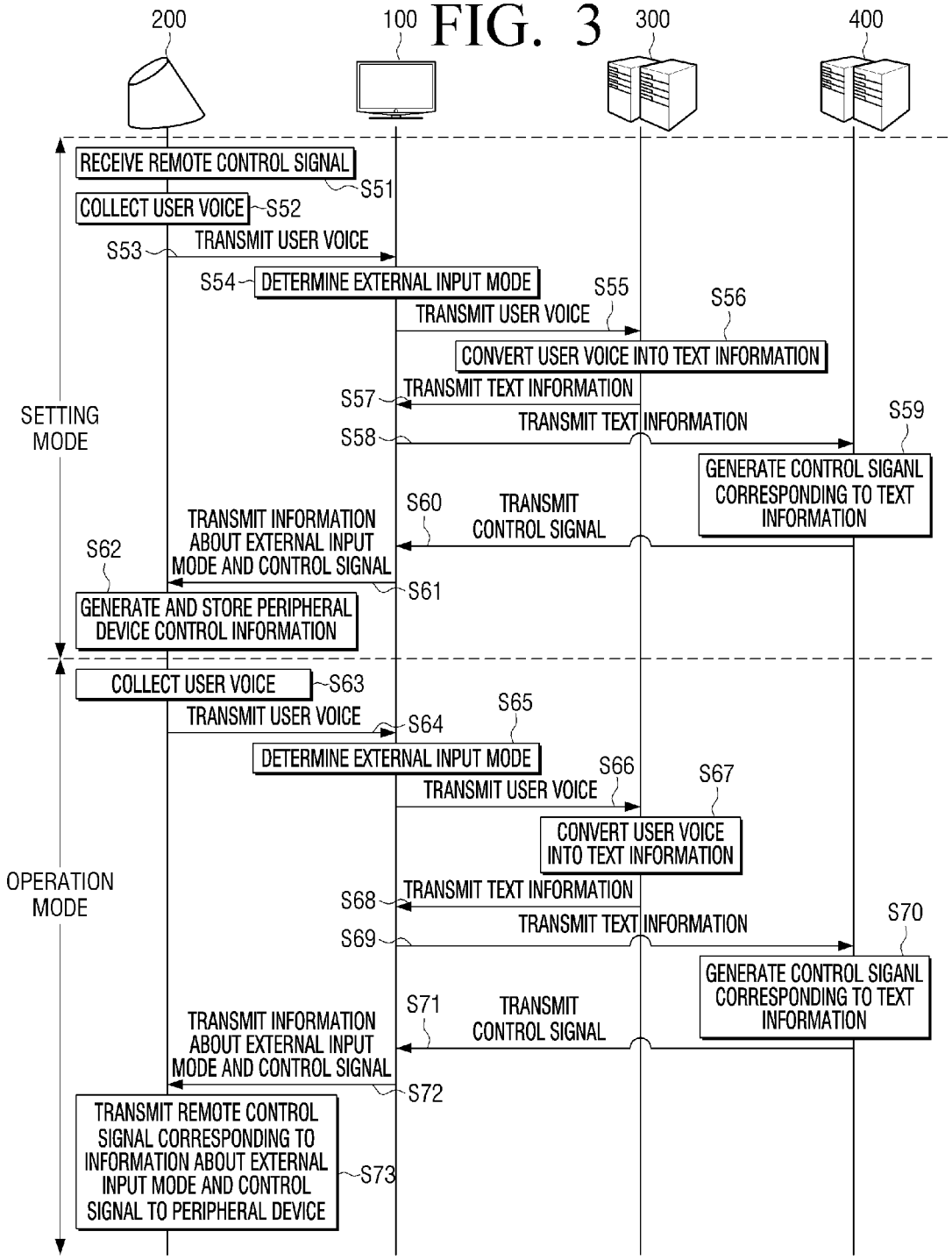

FIGS. 2 and 3 are timing diagrams illustrating respective operations of the interactive system of FIG. 1. In detail, FIG. 2 is a timing diagram illustrating an operation of the interactive system according to a first exemplary embodiment. FIG. 3 is a timing diagram illustrating an operation of the interactive system according to a second exemplary embodiment First Exemplary Embodiment Referring to FIG. 2, if a setting mode starts, the electronic device 20 receives a remote control signal from the remote controller (not shown) which controls the peripheral device of the display apparatus 100 (S1). In other words, if a user inputs a particular button of the remote controller for controlling the peripheral device in the setting mode, the remote controller transmits a remote control signal corresponding to the input button to the electronic device 200.

If the user utters a voice, or statement, corresponding to the particular button of the remote controller, the electronic device 200 collects the voice of the user (S2). The electronic device 200 transmits the voice of the user to the display apparatus 100 (S3). In detail, the electronic device 200 may collect the voice uttered by the user within a preset distance and transmit the voice to the display apparatus 100.

For this purpose, the electronic device 200 may include a microphone, etc. through which the voice uttered by the user is input. In this case, the microphone is installed in the electronic device 200 to form a single body or may be installed separately from the electronic device 200. If the microphone is separate from the electronic device 200, the microphone may be realized in a shape held by the user or a shape placed on a table and may be connected to the electronic device 200 through a wire or wireless network.

If the display apparatus 100 receives the voice of the user from the electronic device 200, the display apparatus 100 determines an external input mode thereof (S4). The external input mode refers to a mode for inputting and outputting a signal between the display apparatus 100 and an external device and may vary according to signal transmission standards supported by the external device. The display apparatus 100 transmits the voice of the user received from the electronic device 200 to the first server 300 (S5).

The first server 300 converts the voice of the user received from the display apparatus 100 into text information (S6). The first server 300 transmits the text information to the display apparatus 100 (S7). In detail, the first server 300 may convert the voice of the user received from the display apparatus 100 by using an algorithm for Speech to Text (STT).

The display apparatus 100 transmits the text information received from the first server 300 and information about the external input mode determined in S4 to the second server 400 (S8).

If the second server 400 receives the text information and the information about the external input mode from the display apparatus 100, the second server 400 generates a control signal corresponding thereto (S9). The second server 400 transmits the control signal to the display apparatus 100 (S10).

The display apparatus 100 transmits the control signal received from the second server 400 to the electronic device 200 (S11). The electronic device 200 matches the control signal received from the display apparatus 100 with the remote control signal received from the remote controller to generate and store peripheral device control information (S12).

The electronic device 200 may repeat the above-described processes with respect to a plurality of buttons of the remote controller, which controls the peripheral device, to store the peripheral device control information with respect to each of the plurality of buttons of the remote controller. If there are a plurality of remote controllers for controlling the peripheral device, the electronic device 200 may store peripheral device control information with respect to the plurality of remote controllers. If the peripheral device control information is completely set with respect to the remote controller, the electronic device 200 may control the peripheral device of the display apparatus 100 through the voice of the user in an operation mode.

In other words, if the user utters the voice to control the peripheral device of the display apparatus 100 in the operation mode, the electronic device 200 collects the voice of the user (S13). The electronic device 200 transmits the voice of the user to the display apparatus 100 (S14).

If the display apparatus 100 receives the voice of the user from the electronic device 200, the display apparatus 100 determines the external input mode thereof (S15). The display apparatus 100 transmits the voice of the user received from the electronic device 200 to the first server 300 (S16).

The first server 300 converts the voice of the user received from the display apparatus 100 into text information (S17). The first server 300 transmits the text information to the display apparatus 100 (S18). The first server 300 transmits the text information received from the first server 300 and information about the external input mode determined in S15 to the second server 400 (S19).

If the second server 400 receives the text information and the information about the external input mode from the display apparatus 100, the second server 400 generates a control signal corresponding thereto (S20). The second server 400 transmits the control signal to the display apparatus 100 (S21).

The display apparatus 100 transmits the control signal received from the second server 400 to the electronic device 200 (S22). The electronic device 200 transmits one of remote control signals of pre-stored peripheral device control information, which corresponds to the control signal received from the display apparatus 100, to the peripheral device (S23). If there are a plurality of peripheral devices, the electronic device 200 may transmit a remote control signal to the plurality of peripheral devices according to a multicasting method. Also, only one of the plurality of peripheral devices capable of recognizing the transmitted remote control signal may be controlled by the remote control signal.

Second Exemplary Embodiment

Referring to FIG. 3, if a setting mode starts, the electronic device 200 receives a remote control signal from the remote controller (not shown) which controls the peripheral device of the display apparatus 100 (S51). In other words, if a user inputs a particular button of the remote controller which controls the peripheral device in the setting mode, the remote controller transmits a remote control signal corresponding to the input button to the electronic device 200. If the user utters a voice corresponding to the particular button of the remote controller, the electronic device 200 collects the voice of the user (S52). The electronic device 200 transmits the voice of the user to the display apparatus 100 (S53).

If the display apparatus 100 receives the voice of the user from the electronic device 200, the display apparatus 100 determines an external input mode thereof (S54). The display apparatus 100 transmits the voice of the user received from the electronic device 200 to the first server 300 (S55).

The first server 300 converts the voice of the user received from the display apparatus 100 into text information (S56). The first server 300 transmits the text information to the display apparatus 100 (S57).

The display apparatus 100 transmits the text information received from the first server 300 to the second server 400 (S58).

If the second server 400 receives the text information from the display apparatus 100, the second server 400 generates a control signal corresponding to the text information (S59). The second server 400 transmits the control signal to the display apparatus 100 (S60).

The display apparatus 100 transmits the control signal received from the second server 400 and information about the external input mode determined in S54 to the electronic device 200 (S61). The electronic device 200 matches the control signal received from the display apparatus 100 and the information about the external input mode with the remote control signal received from the remote controller to generate and store peripheral device control information (S62).

The electronic device 200 may repeat the above-described processes with respect to a plurality of buttons of the remote controller, which controls the peripheral device, in order to store the peripheral device control information with respect to each of the plurality of buttons of the remote controller. If there are a plurality of remote controllers for controlling the peripheral device, the electronic device 200 may store peripheral device control information with respect to the plurality of remote controllers. If the peripheral device control information is completely set with respect to the remote controller, the electronic device 200 may control the peripheral device of the display apparatus 100 through the voice of the user in the operation mode.

In other words, if the user utters the voice to control the peripheral device of the display apparatus 100 in the operation mode, the electronic device 200 collects the voice of the user (S63). The electronic device 200 transmits the voice of the user to the display apparatus 100 (S64).

If the display apparatus 100 receives the voice of the user from the electronic device 200, the display apparatus 100 determines the external input mode thereof (S65). The display apparatus 100 transmits the voice of the user received from the electronic device 200 to the first server 300 (S66).

The first server 300 converts the voice of the user received from the display apparatus 100 into the text information (S67). The first server 300 transmits the text information to the display apparatus 100 (S68). The display apparatus 100 transmits the text information received from the first server 300 to the second server 400 (S69).

If the second server 400 receives the text information from the display apparatus 100, the second server 400 generates the control signal corresponding to the text information (S70). The second server 400 transmits the control signal to the display apparatus 100 (S71).

The display apparatus 100 transmits the control signal received from the second server 400 and the information about the external input mode determined in S65 to the electronic device 200 (S72). The electronic device 200 transmits one of remote control signals of pre-stored peripheral device control information, which corresponds to the control signal received from the display apparatus 100 and the information about the external input mode, to the peripheral device (S73). If there are a plurality of peripheral devices, the electronic device 200 may transmit the remote control signal to the plurality of peripheral devices according to a multicasting method, and only the peripheral device capable of recognizing the transmitted remote control signal may be controlled by the remote control signal.

In FIGS. 2 and 3, if the display apparatus 100 receives the voice of the user, the display apparatus 100 determines the external input mode. However, a process of determining the external input mode of the display apparatus 100 may be omitted. In other words, if a collected user voice is not a command related to controlling the peripheral device or it is determined that identifying of a remote control signal is not difficult although the external input mode is not determined, the process of determining the external input mode of the display apparatus 100 may be omitted.

Figure 4:
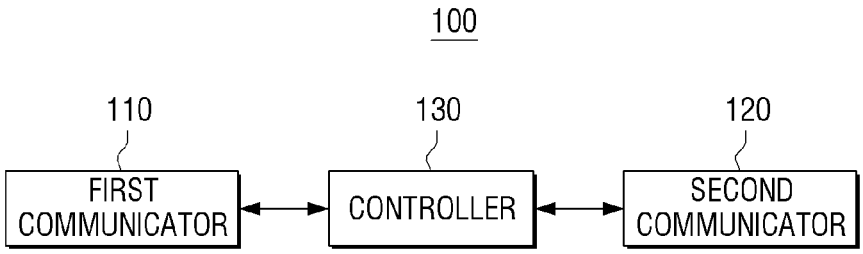
FIG. 4 is a block diagram illustrating a structure of a display apparatus of FIG. 1.

FIG. 4 is a block diagram illustrating a structure of the display apparatus 100 of FIG. 1. Referring to FIG. 4, the display apparatus 100 includes a first communicator 110, a second communicator 120, and a controller 130.

The first communicator 110 communicates with the electronic device 200. In detail, the first communicator 110 receives the user voice from the electronic device 200 and transmits the control signal corresponding to the user voice to the electronic device 200. According to an exemplary embodiment, the first communicator 110 may transmit the information about the external input mode of the display apparatus 100 to the electronic device 200.

The first communicator 110 may communicate with the electronic device 200 by using a wireless communication technology such as Wifi, Bluetooth, Infrared Data Association (IRDA), Radio Frequency (RF), IEEE 802.11, wireless local area network (WLAN), high rate wireless personal area network (HR WPAN), ultra wide-band (UWB), low rate wireless personal area network (LR WPAN), IEEE 1394, or the like.

The second communicator 120 communicates with a server. In detail, the second communicator 120 transmits the user voice received through the first communicator 110 to the first server 300 and receives the text information corresponding to the user voice from the first server 300. The second communicator 120 transmits the text information received from the first server 300 to the second server 400 and receives the control signal corresponding to the text information from the second server 400. The second communicator 120 may be connected to the first and second servers 300 and 400 through a network such as the Internet or the like.

The second communicator 120 transmits the text information received from the first server 300 and the information about the external input mode of the display apparatus 100 to the second server 400 and receives the control signal corresponding to the text information and the information about the external input mode from the second server 400.

As described above, the second communicator 120 is realized as one element to communicate with the first and second servers 300 and 400. However, the display apparatus 100 may include two second communicators to respectively communicate with the first and second servers 300 and 400.

The control signal received by the second communicator 120 from the second server 400 may match with the remote control signal which is related to controlling the peripheral device of the display apparatus 100.

The controller 130 controls an overall operation of the display apparatus 100. In other words, the controller 130 controls elements of the display apparatus 100 to control operations respectively corresponding to the elements. In particular, if the user voice is received through the first communicator 110, the controller 130 transmits the user voice to the first and second servers 300 and 400 through the second communicator 120 and receives the control signal corresponding to the user voice. Also, the controller 130 transmits the received control signal to the electronic device 200.

If the user voice is received from the electronic device 200, the controller 130 determines the external input mode of the display apparatus 100. According to an exemplary embodiment, the controller 130 may control to transmit the information about the determined external input mode to the electronic device 200 or the second server 400.

If the control signal received from the second server 400 is a control signal for controlling the display apparatus 100, i.e., the external input mode is not used, in the operation mode, the controller 130 controls an operation of the display apparatus 100 according to the control signal received from the second server 400.

Figure 5:
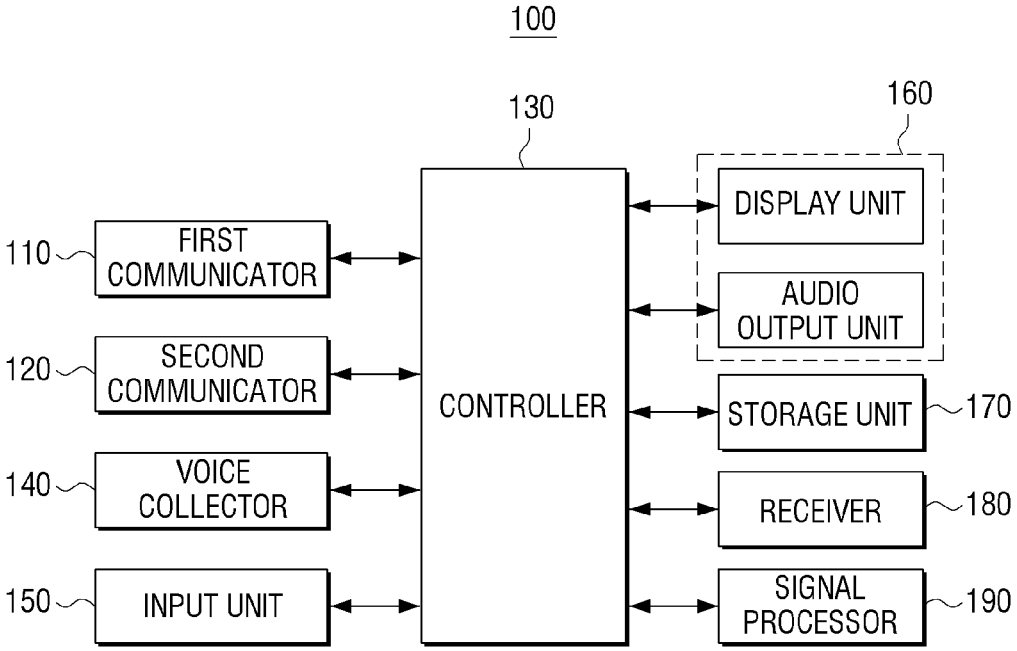
FIG. 5 is a block diagram illustrating a detailed structure of the display apparatus of FIG. 4.

FIG. 5 is a block diagram illustrating a detailed structure of the display apparatus 100 of FIG. 4. Referring to FIG. 4, the display apparatus 100 includes the first communicator 110, the second communicator 120, the controller 130, a voice collector 140, an input unit 150, an output unit 160, a storage unit 170, a receiver 180, and a signal processor 190. Descriptions of elements of FIG. 5 overlapping with those of the elements of FIG. 4 will be omitted.

The second communicator 120 communicates with a server. The second communicator 120 receives only the control signal from the second server 400 in FIG. 4 but may receive response message information corresponding to the user voice from the second server 400. In other words, the second server 400 may include the control signal corresponding to the received text information and the response message information related to a particular function executed according to the control signal.

For example, if the user utters voice "Change to channel 25." when viewing a cable broadcast by using a set-top box, the electronic device 200 may collect the user voice and transmit the user voice to the display apparatus 100. The user voice may be transmitted to the first server 300 to be converted into text information and then may be transmitted to the second server 400. Here, the second server 400 may transmit a control signal corresponding to a channel change command and response message information corresponding to the control signal to the display apparatus 100. The display apparatus 100 may output a response message, such as "Channel has been changed to 25," or "Channel has been completely changed," as a text or a voice.

The voice collector 140 collects the voice of the user. For example, the voice collector 140 may be realized as a microphone, which collects the voice of the user, to be installed in the display apparatus 100 in order to form a single body or may be realized separately from the display apparatus 100.

The voice collector 140 processes the collected user voice to generate a voice signal. In other words, the voice collector 140 removes noise (e.g., an air conditioner sound, a vacuum cleaner sound, a music sound, etc.) from the collected user voice to generate the voice signal. In detail, if an analog user voice is input, the voice collector 140 samples the analog user voice to convert the analog user voice into a digital signal. The voice collector 140 also calculates energy of the digital signal to determine whether the energy of the digital signal is greater than or equal to a preset value.

If the energy of the digital signal is greater than or equal to the preset value, the voice collector 140 removes a noise component from the digital signal and then transmits the digital signal to the first communicator 110. Here, the noise component may be an unexpected noise and may include an air conditioner sound, a vacuum cleaner sound, a music sound, etc. If the energy of the digital signal is smaller than the preset value, the voice collector 140 waits for another input without performing particular processing with respect to the digital signal. Therefore, complete audio processing is not enabled by another sound other than the voice uttered by the user, and thus unnecessary power consumption may be prevented.

Figure 6:
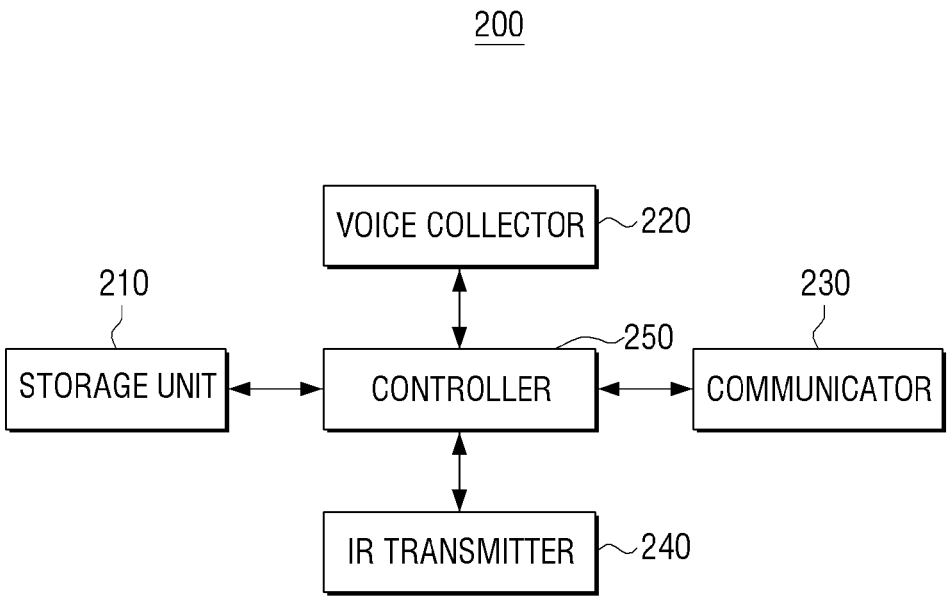
FIG. 6 is a block diagram illustrating a structure of an electronic device of FIG. 1.

The voice collector 140 of the display apparatus 100 may perform the same function as a voice collector 220 of the electronic device 200 of FIG. 6. If the user voice is simultaneously input into the voice collector 140 of the display apparatus 100 and the voice collector 220 of the electronic device 200, one of the user voices respectively collected by the voice collectors 140 and 220 having the higher volume and a smaller amount of noise may be selected. According to an exemplary embodiment, the voice collector 140 of the display apparatus 100 may be omitted.

The input unit 150 is an input means which receives various user controls and transmits the various user controls to the controller 130 and may be realized as an input panel. Here, the input panel may be formed of a touch pad, a key pad having various types of functional keys, numeral keys, special keys, character keys, etc., or a touch screen. The input unit 150 may also be realized as an IR receiver (not shown) for receiving the remote control signal from the remote controller which controls the display apparatus 100.

The input unit 150 may receive various types of user controls which are to control functions of the display apparatus 100. For example, if the display apparatus 100 is realized as a smart TV, the input unit 150 may receive user controls which are to control functions of the smart TV such as power on/off, a channel change, a volume change, etc. In this case, the controller 130 may control the other elements to execute various types of functions corresponding to the user controls input through the input unit 150. For example, the controller 130 may control the receiver 180 to interrupt power supplied to the elements of the display apparatus 100 if a power off command is input and select a channel according to a user control if a channel change is input.

In particular, the input unit 150 may receive a user control for starting a voice recognition mode to collect the user voice. If the user control to start the voice recognition mode is input through the input mode 150, the controller 130 enables the voice collector 140 to collect the user voice. If the voice recognition mode starts, the controller 130 transmits a voice recognition mode start signal to the electronic device 200 in order to enable the voice collector 220 of the electronic device 200.

The output unit 160 outputs at least one of an image and a voice. In detail, the output unit 160 may output the response message corresponding to the user voice as the voice or the text.

For this purpose, the output unit 160 may include a display unit and an audio output unit. In detail, the display unit may be realized as a liquid crystal display (LCD), an organic light-emitting display (OLED), or a plasma display panel (PDP), or the like to provide various display screens which are providable through the display apparatus 100. In particular, the display unit may display the response message corresponding to the user voice in a text form or an image form.

The audio output unit may be realized as a speaker or an output port to output the response message corresponding to the user voice in a voice form.

The storage unit 170 is a storage medium which stores various types of programs, etc. necessary for operating the display apparatus 100 and may be realized as a memory, a hard disk drive (HDD), or the like. For example, the storage unit 170 may include a read only memory (ROM) to store a program for executing an operation of the controller 130, a random access memory (RAM) to temporarily store data according to the execution of the operation of the controller 130, etc. The storage unit 170 may further include an electrically erasable and programmable ROM (EEPROM), etc. which are to store various types of reference data.

In particular, the storage unit 170 may pre-store various types of response messages corresponding to the user voice as voice or text data. Therefore, the controller 130 may read voice or text data corresponding to voice message information (in particular, a control signal) received from the second server 400 from the storage unit 170 and output the voice or text data to the audio output unit or the display unit. In this case, the controller 130 may perform signal processing, such as decoding or the like, with respect to the voice data, amplify the decoded voice data, and output the amplified voice data to the audio output unit. Also, the controller 130 may constitute a UI screen so that the UI screen includes a text constituting the text data and output the UI screen through the display unit. In the above-described exemplary embodiment, the controller 130 performs the signal processing with respect to the voice and text data read from the storage unit 170. However, the controller 130 may control the signal processor 190 to perform signal processing with respect to the voice and text data.

The receiver 180 receives various types of contents. In detail, the receiver 180 receives a content from a broadcasting station which transmits a broadcast program content by using a broadcast network or from a web server which transmits a content file by using the Internet. The receiver 180 may also receive contents from various types of recording media players which are installed in or connected to the display apparatus 100. A recording media player refers to an apparatus which plays contents stored in various types of recording media such as a CD, a DVD, a hard disk, a blue-ray disk, a memory card, a universal serial bus (USB) memory, etc.

In the exemplary embodiment of receiving the content from the broadcasting station, the receiver 180 may be realized in a form including elements such as a tuner (not shown), a demodulator (not shown), an equalizer (not shown), etc. In the exemplary embodiment of receiving the content from a source such as the web server, the receiver 180 may be realized as a network interface card (not shown). In the exemplary embodiment of receiving the contents from the various types of recording media players, the receiver 180 may be realized as an interface unit (not shown) which is connected to the recording media players. As described above, the receiver 180 may be realized in various forms according to exemplary embodiments.

The signal processor 190 performs signal processing with respect to the content received from the receiver 180 to output the content through the output unit 160.

In detail, the signal processor 190 performs an operation, such as decoding, scaling, a frame rate conversion, etc., with respect to a video signal of the content to convert the video signal into a form which is output through the display unit. The signal processor 190 also performs signal processing, such as decoding or the like, with respect to an audio signal of the content to convert the audio signal in a form which is output through the audio output unit.

FIG. 6 is a block diagram illustrating a structure of the electronic device 200 of FIG. 1. Referring to FIG. 6, the electronic device 200 includes a storage unit 210, the voice collector 220, a communicator 230, an IR transmitter 240, and a controller 250.

The storage unit 210 stores the peripheral device control information. The peripheral device control information refers to information in which the remote control signal to control the peripheral device of the display apparatus 100 matches with the control signal corresponding to the user voice. According to another exemplary embodiment, the peripheral device control information may further include the information about the external input mode of the display apparatus 100.

The storage unit 210 may be realized as various types of memory units on which read/write is possible as on a RAM and may perform a write operation in the setting mode and a read operation in the operation mode.

The voice collector 220 collects the user voice. As described above, the voice collector 220 of the electronic device 200 performs the same function as the voice collector 140 of the display apparatus 100, and thus a detailed description thereof will be omitted.

The communicator 230 communicates with the display apparatus 100. In detail, the communicator 230 is connected to the first communicator 110 of the display apparatus 100 to communicate with the display apparatus 100.

In particular, the communicator 230 transmits the user voice collected through the voice collector 220 to the display apparatus 100 and receives the control signal corresponding to the user voice from the display apparatus 100. According to another exemplary embodiment, the communicator 230 may further receive the information about the external input mode of the display apparatus 100 along with the control signal.

The IR transmitter 240 transmits the remote control signal to control the peripheral device. In detail, the IR transmitter 240 transmits the remote control signal corresponding to the control signal received by the communicator 230 to the peripheral device under control of the controller 250.

The controller 250 controls an overall operation of the electronic device 200. In detail, the controller 250 controls elements of the electronic device 200 to perform operations respectively corresponding to the elements. In particular, in the operation mode, if the control signal corresponding to the user voice is received through the communicator 230, the controller 250 controls the IR transmitter 240 to compare the received control signal with a control signal of the peripheral device control information in the storage unit 210 and transmit a remote control signal corresponding to the matching control signal to the peripheral device.

According to another exemplary embodiment, in the operation mode, if the communicator 230 receives the information about the external input mode of the display apparatus 100 along with the control signal, the controller 250 may control the IR transmitter 240 to compare the received control signal and the information about the external input mode with the control signal and information about the external input mode, which are included in the peripheral device control information of the storage unit 210, to transmit a corresponding remote control signal to the peripheral device.

The IR transmitter 240 may transmit the remote control signal to peripheral devices of the display apparatus 100 according to a broadcasting method, and only one of the peripheral devices recognizing the transmitted remote control signal may perform an operation corresponding to the remote control signal.

Figure 7:
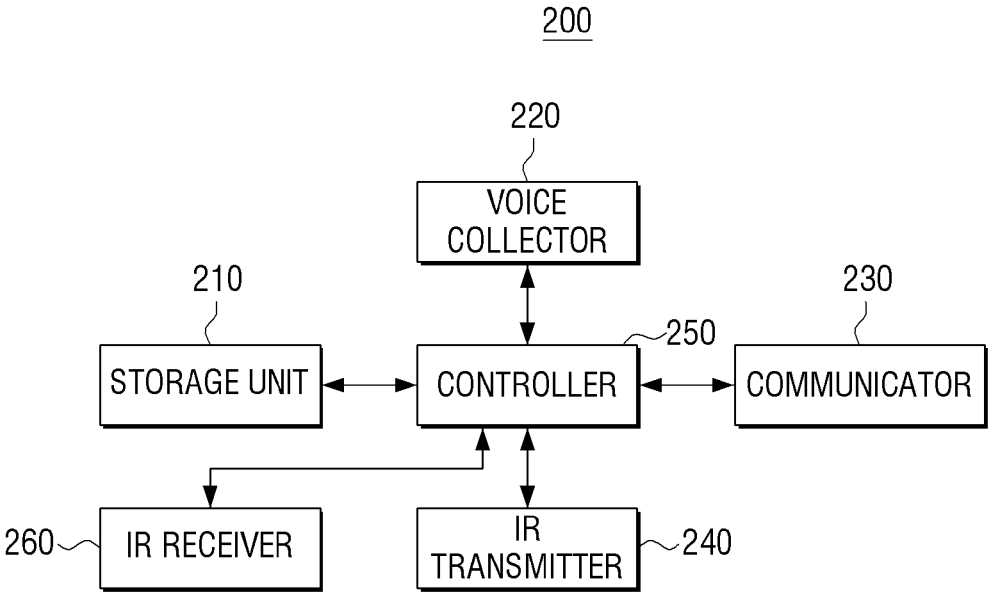
FIG. 7 is a block diagram illustrating a detailed structure of the electronic device of FIG. 6.

FIG. 7 is a block diagram illustrating a detailed structure of the electronic device 200 of FIG. 6. Referring to FIG. 7, the electronic device 200 may further include an IR receiver 260 in addition to the elements of FIG. 6. The elements of FIG. 7 except the IR receiver 260 have the same functions as those of FIG. 6, and thus their detailed descriptions will be omitted.

The IR receiver 260 receives the remote control signal from the remote controller. In detail, the IR receiver 260 receives the remote control signal from the remote controller, which controls the peripheral device of the display apparatus 100, in the setting mode.

The controller 250 controls the communicator 230 to transmit the user voice collected in response to the received remote control signal to the display apparatus 100 and to receive the control signal corresponding to the user voice from the display apparatus 100. The controller 250 matches the received remote control signal with the control signal to generate the peripheral device control information and stores the peripheral device control information in the storage unit 210.

According to another exemplary embodiment, if the communicator 230 receives the control signal along with the information about the external input mode of the display apparatus 100 from the display apparatus 100, the controller 250 may match the remote control signal, the control signal, and the information about the external input mode with one another to generate the peripheral device control information.

Figure 8:
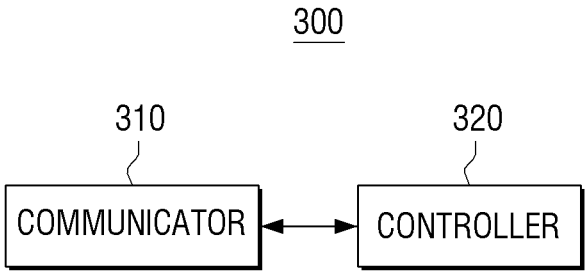
FIG. 8 is a block diagram illustrating a structure of a first server of FIG. 1.

FIG. 8 is a block diagram illustrating a structure of the first server 300 of FIG. 1. Referring to FIG. 8, the first server 300 includes a communicator 310 and a controller 320.

The communicator 310 communicates with the display apparatus 100. In detail, the communicator 310 receives the user voice from the display apparatus 100 and transmits the text information corresponding to the user voice to the display apparatus 100. For this purpose, the communicator 310 may include various types of communication modules such as a near field communication (NFC) module (not shown), a wireless communication module (not shown), a network interface (not shown), etc.

The controller 320 controls an overall operation of the first server 300. In particular, if the user voice is received from the display apparatus 100, the controller 320 controls the communicator 310 to generate the user voice as the text information and transmit the text information to the display apparatus 100.

In detail, the controller 320 may generate the user voice as the text information by using a Speech to Text (STT) engine. Here, the STT engine is a module for converting a voice signal into a text and may convert the voice signal into the text by using conventionally disclosed various STT algorithms.

For example, the controller 320 detects a start and an end of the voice uttered by the user within a received voice signal to determine a voice section. In detail, the controller 320 calculates energy of the received voice signal and classifies the energy into energy levels of the voice signal to detect the voice section through an dynamic programming. The controller 320 also detects a phoneme, which is a minimum unit of a voice, within the detected voice section based on an acoustic model to generate phoneme data and applies a Hidden Markov Model (HMM) probability model to the generated phoneme data to generate text information.

Figure 9:
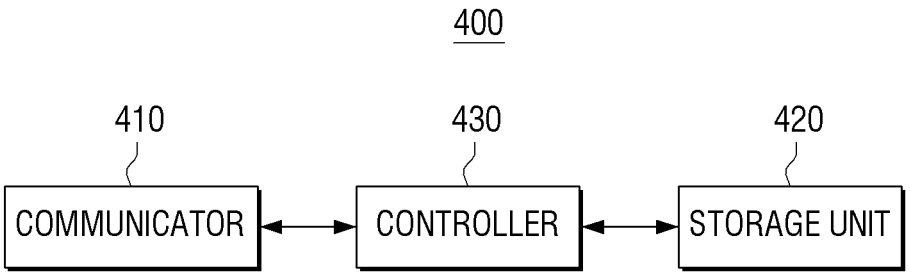
FIG. 9 is a block diagram illustrating a structure of a second server of FIG. 1.

FIG. 9 is a block diagram illustrating a structure of the second server 400 of FIG. 1. Referring to FIG. 9, the second server 400 includes a communicator 410, a storage unit 420, and a controller 430.

The communicator 410 communicates with the display apparatus 100. In detail, the communicator 410 receives the text information from the display apparatus 100 and transmits the response message information corresponding to the text information to the display apparatus 100. For this purpose, the communicator 410 may include various types of communication modules such as a NFC module (not shown), a wireless communication module (not shown), etc.

The storage unit 420 stores various types of information for generating the control signal and the response message information corresponding to the text information received from the display apparatus 100.

In detail, the storage unit 420 may store a speech act, a head act, and a core element, which is pre-stored, in every particular service domain. For example, in the case of broadcast domain, the speech act may include a statement, a request, a Why question, a Yes-No question, etc. The head act may include TV on/off, a program search, a program time search, a program reservation, etc. The core element may include a genre, a program name, a start time, a channel name, an actor name, etc.

The storage unit 420 may also include a corpus database (DB) which stores a response corresponding to an utterance intention of the user in each domain. For example, in a broadcast service domain, the storage unit 420 may store " . . . A genre of a program is . . . " as a response corresponding to an utterance intention of the user inquiring about a genre of a particular program and " . . . A start time of the program is . . . " as a response corresponding to an utterance intention of the user inquiring about a start time of the program.

The storage unit 420 may store control signals respectively matching with the utterance intentions of the user. For example, if an utterance intention of the user is a channel change, the storage unit 420 may match a control signal for the channel change with the utterance intention and store the control signal. If the utterance intention of the user is a reserved record, the storage unit 420 may match a control command for executing a reserved record function of a particular program with the utterance intention and store the control signal.

The controller 430 controls an overall operation of the second sever 400. In particular, if the text information corresponding to the user voice is received from the display apparatus 100 through the communicator 410, the controller 430 may control to generate at least one of the control signal and the response message corresponding to the received text information and transmit the control signal and the response message to the display apparatus 100 through the communicator 410.

In detail, the controller 430 checks the utterance intention of the user corresponding to the text information received from the display apparatus 100 by using the speech act, the head act, and the core element stored in the storage unit 420 and generates a control command and a response corresponding to the utterance intention of the user as response information.

For example, if a text "Reserve ○ ○ ○ (a broadcast program)." is received from the display apparatus 100, the controller 430 determines through the speech act that a text received is a sentence form related to "Request" and determines through the head act and the core element that program reservation with respect to "○ ○ ○" is wanted. As a result, the controller 430 may determine that an utterance intention of the user corresponding to received text information is a request for "program reservation" with respect to "○ ○ ○."

Therefore, the controller 430 may generate a control signal, to execute a reserved record function of "○ ○ ○" in the display apparatus 100, with respect to the utterance intention of the user requesting the program reservation with respect to "○ ○ ○." In this case, the controller 430 additionally generates response message information "Record of ○ ○ ○ has been reserved." as a text by using the corpus DB and transmits the control signal and the text to the display apparatus 100.

If the communicator 410 receives the text information and the information about the external input mode of the display apparatus 100 from the display apparatus 100, the controller 430 generates the control signal in consideration of the text information and the information about the external input mode. In detail, if the external input mode of the display apparatus 100 is different with respect to the same text information, the controller 430 controls to transmit a different control signal to the display apparatus 100.

Therefore, even if a plurality of peripheral devices exist, the electronic device 200 may transmit a remote control signal of a particular peripheral device the user wants to control, according to a current external input mode of the display apparatus 100.

Figure 10:
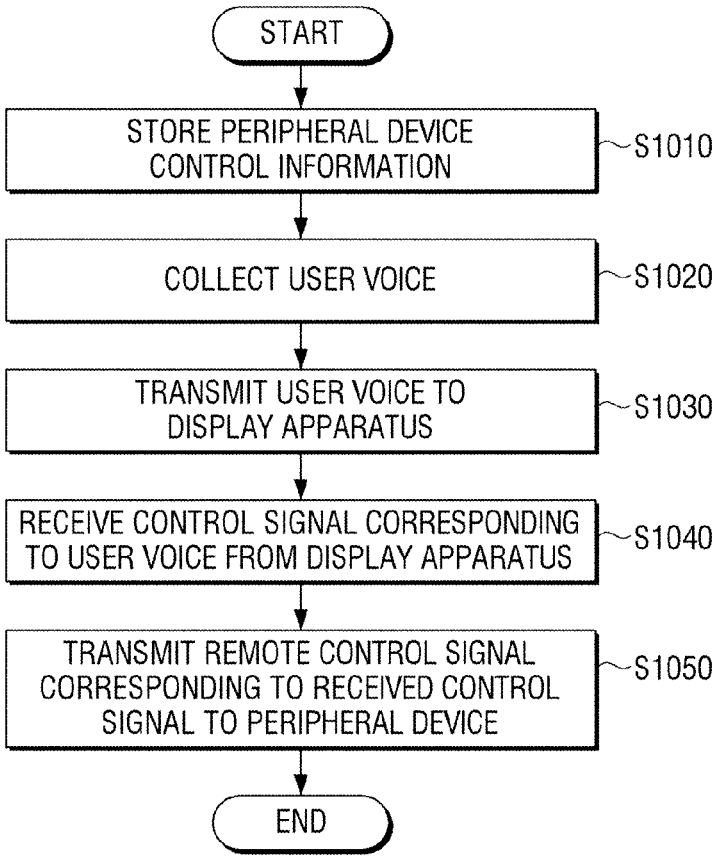
FIG. 10 is a flowchart illustrating a method of controlling an electronic device according to an exemplary embodiment.

FIG. 10 is a flowchart illustrating a method of controlling an electronic device according to an exemplary embodiment.

Referring to FIG. 10, in operation S1010, the electronic device stores peripheral device control information. In detail, the electronic device may store peripheral device control information in which a remote control signal to control a peripheral device of a display apparatus matches with a control signal corresponding to a user voice.

Here, operation S1010 may include: receiving a remote control signal from a remote controller which controls the peripheral device of the display apparatus; collecting a user voice in response to the received remote control signal; transmitting the collected user voice to the display apparatus; receiving a control signal corresponding to the user voice from the display apparatus; and generating and storing peripheral device control information in which the received remote control signal matches with the control signal.

According to another exemplary embodiment, operation S1010 may include: receiving a remote control signal from the remote controller which controls the peripheral device of the display apparatus; collecting a user voice in response to the received remote control signal; transmitting the collected user voice to the display apparatus; receiving a control signal corresponding to the user voice and information about an external input mode of the display apparatus from the display apparatus; and generating and storing peripheral device control information in which the received remote control signal, the control signal, and the information about the external input mode match with one another.

In operation S1020, the electronic device collects a user voice. In operation S1030, the electronic device transmits the collected user voice to the display apparatus.

In operation S1040, the electronic device receives a control signal corresponding to the user voice from the display apparatus. In operation S1050, the electronic device transmits a remote control signal corresponding to the received control signal to the peripheral device. In detail, the electronic device may compare a control signal of the peripheral device control information stored in operation S1010 with the received control signal to transmit a corresponding remote control signal to the peripheral device.

According to another exemplary embodiment, in operation S1040, the electronic device may receive the control signal and the information about the external input mode of the display apparatus from the display apparatus. In operation S1050, the electronic device may transmit the received control signal and a remote control signal corresponding to the information about the external input mode to the peripheral device.

Figure 11:
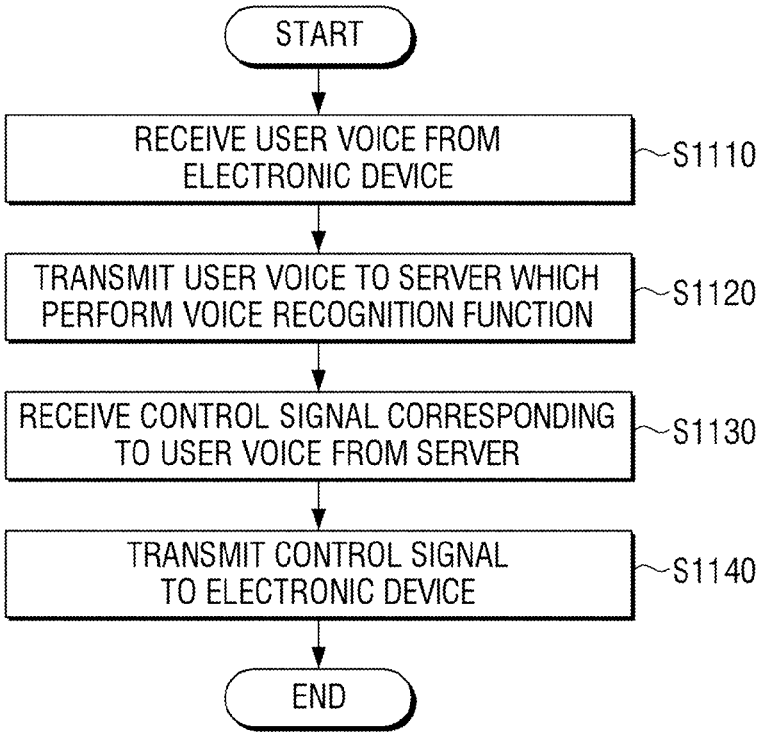
FIG. 11 is a flowchart illustrating a method of controlling a display apparatus according to an exemplary embodiment of the present general inventive concept.

FIG. 11 is a flowchart illustrating a method of controlling the display apparatus 100 according to an exemplary embodiment.

In operation S1110, the display apparatus 100 receives a user voice from an electronic device. In operation S1120, the display apparatus 100 transmits the received user voice to a server which executes a voice recognition function. In operation S1130, the display apparatus 100 receives a control signal corresponding to the user voice from the server. In operation S1140, the display apparatus 100 transmits the received control signal to the electronic device.

The method of FIG. 11 may further include: if the user voice is received, determining an external input mode; and transmitting information about the determined external input mode to the server. Therefore, in operation S1130, the display apparatus 100 may receive a control signal corresponding to the user voice and a control signal corresponding to the information about the external input mode.

The method may further include: if the user voice is received, determining an external input mode; and transmitting information about the determined external input mode to the electronic device.

The methods of controlling the electronic device and the display apparatus according to the above-described various exemplary embodiments may be realized as a program which is executable in the electronic device and the display apparatus. The program may be stored and used on various types of recording media.

In detail, a code for performing the methods may be stored on various types of nonvolatile recoding media such as a flash memory, a ROM, an erasable programmable ROM (EPROM), an EEPROM, a hard disk, a removable disk, a memory card, a USB memory, a CD-ROM, etc.

Also, a bus is not shown in the above-described block diagrams illustrating the display apparatus, the electronic device, and servers. However, communications among elements of the display apparatus, the electronic device, and the servers may be performed through the bus. In addition, each device may further include a processor such as a central processing unit (CPU), a microprocessor, or the like which performs the above-described various operations.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

[1. An electronic device which communicates with a display apparatus, the electronic device comprising:

a storage which stores peripheral device control information, said peripheral device control information being related to a remote control signal for controlling a peripheral device of the display apparatus that matches with a control signal corresponding to a user voice;

a voice collector which collects the user voice;

a communicator which transmits the collected user voice to the display apparatus and receives the control signal corresponding to the user voice from the display apparatus;

an infrared ray (IR) transmitter which transmits the remote control signal for controlling the peripheral device; and a controller which, if the control signal is received from the display apparatus, controls the IR transmitter to transmit the remote control signal corresponding to the received control signal among remote control signals stored in the storage unit, to the peripheral device.]

[2. The electronic device of claim 1, further comprising:

an IR receiver which receives the remote control signal from a remote controller which controls the peripheral device of the display apparatus, wherein the controller transmits the collected user voice to the display apparatus in response to the received remote control signal and receives the control signal corresponding to the user voice from the display apparatus to generate the peripheral device control information.]

[3. The electronic device of claim 1, wherein:

the peripheral device control information further comprises information about a received external input mode;

the communicator receives the control signal and the information about the external input mode of the display apparatus; and if the control signal and the information about the external input mode are received from the display apparatus, the controller controls the IR transmitter to transmit the remote control signal corresponding to the received control signal and the external input mode to the peripheral device.]

[4. The electronic device of claim 3, further comprising:

an IR receiver which receives the remote control signal from a remote controller which controls the peripheral device of the display apparatus, wherein the controller transmits the collected user voice to the display apparatus in response to the remote control signal and receives the control signal corresponding to the user voice and the information about the external input mode of the display apparatus from the display apparatus to generate the peripheral device control information.]

[5. The electronic device of claim 1, wherein the electronic device is one from among an IR blaster and a multiband remote controller (MBR).]

[6. A display apparatus which communicates with a first device which is to control a second device, the display apparatus comprising:

a first communicator which communicates with the first device;

a second communicator which communicates with a server which performs a voice recognition function; and a controller which, if a user voice is received from the first device, transmits the received user voice to the server, receives a control signal corresponding to the user voice from the server, and transmits the control signal to the first device, wherein the control signal is a signal which corresponds to a remote control signal for controlling the second device in the electronic device.]

[7. The display apparatus of claim 6, wherein if the user voice is received, the controller controls to determine an external input mode, transmits information about the determined external input mode and the user voice to the server, receives the information about the external input mode and a control signal corresponding to the user voice from the server, and transmits the information about the external input mode and the control signal to the first device.]

[8. The display apparatus of claim 6, wherein if the user voice is received, the controller controls to determine an external input mode and transmit information about the determined external input mode and the control signal received from the server to another server.]

[9. The display apparatus of claim 6, wherein the first device is an electronic device and the second device is a peripheral device of the display apparatus.]

[10. A method of controlling a first device, the method comprising:

storing second device control information in which a remote control signal for controlling a second device of a display apparatus matches with a control signal corresponding to a user voice;

collecting a user voice;

transmitting the collected user voice to the display apparatus;

receiving the control signal corresponding to the user voice from the display apparatus; and transmitting one of pre-stored remote control signals corresponding to the received control signal to the second device.]

[11. The method of claim 10, wherein the storing of the second device control information comprises:

receiving the remote control signal from a remote controller which controls the second device of the display apparatus;

collecting the user voice in response to the remote control signal;

transmitting the collected user voice to the display apparatus;

receiving the control signal corresponding to the user voice from the display apparatus; and generating and storing the second device control information in which the received remote control signal and the control signal match with each other.]

[12. The method of claim 10, wherein:

the second device control information further comprises information about an external input mode;

the reception of the control signal comprises receiving the control signal and information about the external input mode of the display apparatus; and the transmission of the one of the pre-stored remote control signals to the second device comprises transmitting the received control signal and the remote control signal corresponding to the information about the external input mode, to the second device.]

[13. The method of claim 12, wherein the storing of the second device control information comprises:

receiving the remote control signal from the remote controller which controls the second device of the display apparatus;

collecting the user voice in response to the remote control signal;

transmitting the collected user voice to the display apparatus;

receiving the control signal corresponding to the user voice and the information about the external input mode of the display apparatus from the display apparatus; and generating and storing the second device control information in which the received remote control signal, the control signal, and the information about the external input mode match with one another.]

[14. The method of claim 10, wherein the electronic device is one of an infrared ray (IR) blaster and a multiband remote controller (MBR).]

[15. A method of controlling a display apparatus which communicates with a first device which is to control a second device, the method comprising:

receiving a user voice from the first device;

transmitting the received user voice to a server which performs a voice recognition function;

receiving a control signal corresponding to the user voice from the server; and transmitting the received control signal to the first device, wherein the control signal is a signal in the first device which corresponds to a remote control signal which controls the second device.]

[16. The method of claim 15, further comprising:

if the user voice is received, determining an external input mode; and transmitting information about the external input mode, wherein the receiving of the control signal comprises receiving the information related to the external input mode and the control signal corresponding to the user voice from the server.]

[17. The method of claim 15, further comprising:

if the user voice is received, determining an external input mode; and transmitting information about the determined external input mode to the first device.]

[18. The method of claim 15, wherein the first device is an electronic device and the second device is a peripheral device of the display apparatus.]

[19. An interactive system comprising a display apparatus and a first device which is to control a second device of the display apparatus, wherein:

the first device transmits a collected user voice to the display apparatus, receives a control signal corresponding to the user voice, and transmits one of pre-stored remote control signals corresponding to the received control signal to the second device; and the display apparatus transmits the user voice to a server which performs a voice recognition function if the display apparatus receives the user voice from the first device, receives the control signal corresponding to the user voice from the server, and transmits the control signal to the first device.]

[20. The interactive system of claim 19, wherein the first device is an electronic device and the second device is a peripheral device of the display apparatus.]

*21. A display apparatus which is operable to communicate with a first device, the display apparatus comprising:*

*a communicator; and*

*a controller configured to:*

*based on a user voice input received from the first device through the communicator, obtain control command information corresponding to the user voice input for controlling a second device, based on a voice recognition performed with respect to the user voice input, and*

*control the communicator to transmit a first remote control signal including a control signal corresponding to the obtained control command information to the first device, which when received by the first device, causes the first device to transmit a second remote control signal including a control command for controlling the second device, corresponding to the control signal, to the second device,*

*wherein the controller is configured to control the communicator to transmit the first remote control signal to the first device using a first communication method,*

*wherein the first remote control signal causes the first device to transmit the second remote control signal to the second device using a second communication method, and*

*wherein the second communication method of the first device is different from the first communication method of the first device.*

*22. The display apparatus as claimed in claim 21, wherein the first communication method is based on at least one of Wifi, Bluetooth, Infrared Data Association (IRDA), Radio Frequency (RF), IEEE 802.11, WLAN, HR WPAN, UWB, LR WPAN, and IEEE 1394.*

*23. The display apparatus as claimed in claim 21, wherein the second communication method is Infrared Ray (IR) communication.*

*24. The display apparatus as claimed in claim 21, wherein:*

*the first device is a remote controller for controlling the display apparatus; and*

*the control signal is a control signal matching with the second remote control signal for controlling the second device.*

*25. The display apparatus as claimed in claim 21, wherein the controller is configured to, based on the user voice input being received, identify an external input mode, and control the communicator to transmit information regarding the external input mode and the control signal to the first device.*

*26. The display apparatus as claimed in claim 25, wherein the controller is configured to control the communicator to transmit the information regarding the external input mode, which when received by the first device, causes the first device to identify the second device among a plurality of second devices based on the information regarding the external input mode, and to transmit the control command to the identified second device.*

*27. The display apparatus as claimed in claim 21, wherein the controller is configured to control the communicator to, based on the user voice input being received, transmit information regarding an external input mode of the display apparatus to the first device along with the control signal.*

*28. A method for allowing a first device for controlling a display apparatus to control a second device, the method comprising:*

*receiving, from the first device by the display apparatus using a first communication method, a user voice input for controlling the second device;*

*obtaining control command information corresponding to the user voice input for controlling the second device, based on a voice recognition performed with respect to the user voice input; and*

*transmitting, to the first device by the display apparatus, a first remote control signal including a control signal corresponding to the obtained control command information, which when received by the first device, causes the first device to transmit a second remote control signal including a control command for controlling the second device, corresponding to the control signal to the second device,*

*wherein the transmitting the first remote control signal comprises transmitting the first remote control signal to the first device using a first communication method,*

*wherein the first remote control signal causes the first device to transmit the second remote control signal to the second device using a second communication method, and*

*wherein the second communication method of the first device is different from the first communication method of the first device.*

*29. The method as claimed in claim 28, wherein the first communication method is based on at least one of Wifi, Bluetooth, Infrared Data Association (IRDA), Radio Frequency (RF), IEEE 802.11, WLAN, HR WPAN, UWB, LR WPAN, and IEEE 1394.*

*30. The method as claimed in claim 28, wherein the second communication method is Infrared Ray (IR) communication.*

*31. The method as claimed in claim 28 wherein:*

*the first device is a remote controller for controlling the display apparatus; and*

*the control signal is a control signal matching with the second remote control signal for controlling the second device.*

*32. The method as claimed in claim 28, further comprising:*

*based on the user voice input being received, transmitting, by the display apparatus to the first device, information regarding an external input mode of the display apparatus.*

*33. The method as claimed in claim 32, wherein the transmitting the information regarding the external input mode comprises transmitting the information regarding the external input mode, which when received by the first device, causes the first device to identify the second device among a plurality of second devices based on the information regarding the external input mode, and to transmit the control command to the identified second device.*

*34. A display system comprising:*

*a first device; and*

*a display apparatus comprising:*

*a communicator configured to communicate with the first device; and*

*a controller configured to:*

*based on a user voice input received from the first device through the communicator, obtain control command information corresponding to the user voice input for*

*controlling a second device, based on a voice recognition performed with respect to the user voice input, and*

*control the communicator to transmit a first remote control signal including a control signal corresponding to the obtained control command information to the first device,*

*wherein, based on the control signal received by the first device, the first device is configured to transmit a second remote control signal including a control command for controlling the second device, corresponding to the control signal, to the second device,*

*wherein the first device is configured to, based on the first remote control signal received using a first communication method, transmit the second remote control signal to the second device using a second communication method, and*

*wherein the second communication method of the first device is different from the first communication method of the first device.*

*35. The display system as claimed in claim 34, wherein the first communication method is Bluetooth communication and the second communication method is IR communication.*

*36. The display system as claimed in claim 34, wherein:*

*the first device is a remote controller for controlling the display apparatus; and*

*the control signal is a control signal matching with the second remote control signal for controlling the second device.*

* * * * *